United States Patent [19]

Shibata et al.

[11] Patent Number: 4,593,656
[45] Date of Patent: Jun. 10, 1986

[54] INTAKE SYSTEM FOR INTERNAL COMBUSTION ENGINE

[75] Inventors: Hirotaka Shibata, Hamamatsu; Takayoshi Muramatsu, Fukuroi, both of Japan

[73] Assignee: Yamaha Hatsukoki Kabushiki Kaisha, Iwata, Japan

[21] Appl. No.: 750,234

[22] Filed: Jun. 28, 1985

Related U.S. Application Data

[63] Continuation of Ser. No. 246,064, Mar. 20, 1981, abandoned.

[30] Foreign Application Priority Data

Mar. 20, 1980 [JP] Japan ................................. 55-35489

[51] Int. Cl.⁴ ............................................. F02B 27/00
[52] U.S. Cl. .................................. 123/52 M; 180/219
[58] Field of Search ........................ 123/52 R, 52 M; 180/219

[56] References Cited

U.S. PATENT DOCUMENTS

| | | | |
|---|---|---|---|
| 713,350 | 11/1902 | Schmidt | 180/219 |
| 3,698,503 | 10/1972 | Koyama | 180/219 |
| 4,224,919 | 9/1980 | Appelbaum | 180/219 |
| 4,254,746 | 3/1981 | Chiba et al. | 123/52 M |

FOREIGN PATENT DOCUMENTS 52-40258  9/1977  Japan .

Primary Examiner—Craig R. Feinberg
Attorney, Agent, or Firm—Ernest A. Beutler

[57] ABSTRACT

Several embodiments of induction systems for motor vehicles that improve running at low speeds. A plenum chamber is provided which communicates with the intake passage downstream of the throttle valve so as to improve flow dynamics particularly at these running conditions. The plenum chamber is supported by the vehicle chassis independently of the engine and communicates with the induction passage via a flexible conduit.

5 Claims, 5 Drawing Figures

INTAKE SYSTEM FOR INTERNAL COMBUSTION ENGINE

This application is a continuation of application Ser. No. 246,064, filed Mar. 20, 1981, now abandoned.

BACKGROUND OF THE INVENTION

The present invention contemplates to improve the intake passage of an internal combustion engine and accordingly the characteristics of the internal combustion engine and further to enhance the charging efficiency of an air-fuel mixture during a slow running operation thereby to improve the output during the slow running operation.

In the internal combustion engine, generally speaking, the vacuum to be established in a combustion chamber or in a crank case during a suction stroke is applied to an intake passage thereby to suck an air-fuel mixture. When the intake stroke is ended, the intake passage is blocked by an intake valve from the combustion chamber or the crank case. As a result, there is established in the intake passage in the vicinity of the intake valve the so-called "intermittent flow" that the intake flow is interrupted while the intake valve is closed but is restored when the intake valve is opened. These phenomena raise no difficulty when the internal combustion engine is run with the intake flow regulating throttle valve having a larger opening than one half or run at a high speed even with the throttle valve having a smaller opening than one half. However, the phenomena remarkably deteriorate the performance of the internal combustion engine when this engine is run with the throttle valve having a lower opening than that, especially at a relatively slow speed.

More specifically, since the intake flow rate is generally so high in a large opening range of the throttle valve that the flow inertia is high, the intake air is at most compressed in the vicinity of the aforementioned intake valve even after this valve has been opened or closed but is steadily flowing upstream thereof. This means that any reduction in the charging efficiency is not invited by the closure of the intake valve so that no reduction takes place in the resultant output. In a low opening rate, however, since the intake air flow is restricted by the throttle valve, the flow inertia is not high. As a result, the intake air flow is stopped as the intake valve is closed to lower the charging efficiency so that the reduction in the output takes place.

SUMMARY OF THE INVENTION

In order to solve the problem of the reduction in the output during the slow running operation of the aforementioned internal combustion engine, therefore, we, the Inventors, have proposed an intake system for an internal combustion engine, in which a box-shaped structure (which will be referred to as "intake box") is disposed in the intake passage downstream of the throttle valve thereby to store therein when the intake valve is closed so that the mixture temporarily stored in that intake box may be injected into and supplied to the combustion chamber at the subsequent intake stroke.

The intake system for the internal combustion engine thus far proposed can achieve a remarkablve effect. Nevertheless, the present invention contemplates to provide an intake system for an internal combustion engine, in which the efficiency especially during the slow running operating is improved without any substantial change in the appearance of a conventional motorbicycle.

The present invention will now be described in connection with the embodiments thereof with reference to the accompanying drawings.

BRIEF DESCRIPTION OF THE DRAWINGS

As shown in FIG. 1, there are disposed in front of and at the back of a frame 1, respectively, a front wheel 3 which is steered by a handle 2 and a rear wheel 5 which is supported by a back fork 4 and a back stay. Moreover, an internal combustion engine 6 is supported at the front and rear portions of a lower tube 7 of the lower center portion of the frame 1.

Figure 1:
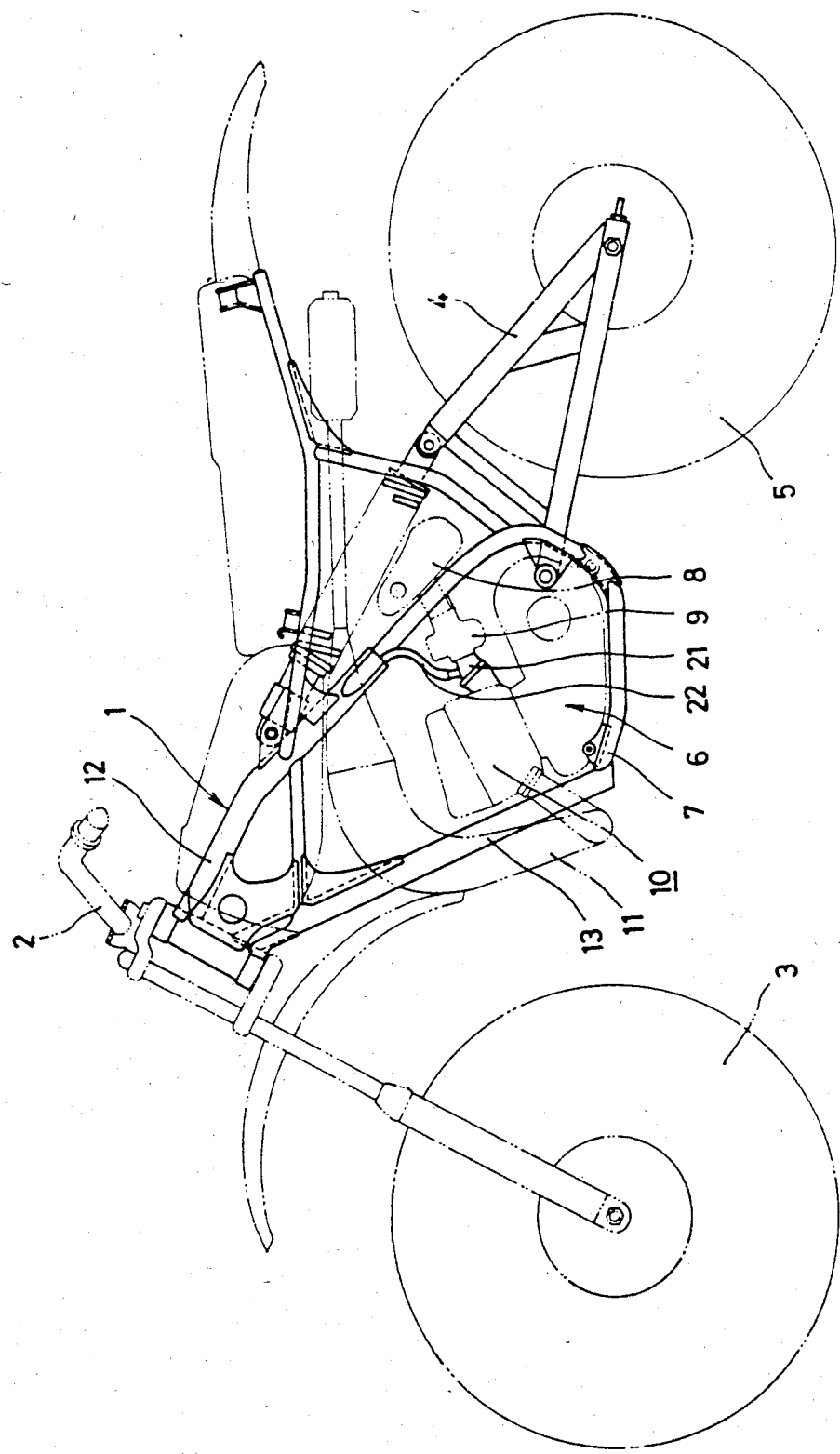
FIG. 1 is a side elevational view, with portion shown in phantom, of a motor cycle embodying this invention constructed in accordance with a first embodiment.

Reference numeral 8 indicates an air cleaner, through which air is sucked and prepared by a carburetor 9 having a throttle valve into an air-fuel mixture, which is burned in a combustion chamber to generate an output until it is discharged out of an exhaust pipe 11.

Of the members constructing the frame 1, numerals 12 and 13 indicate a main pipe and a down tube, respectively. A first embodiment of the present invention is characterized in that the main pipe 12 is employed as an intake box or plenum chamber.

Figure 2:
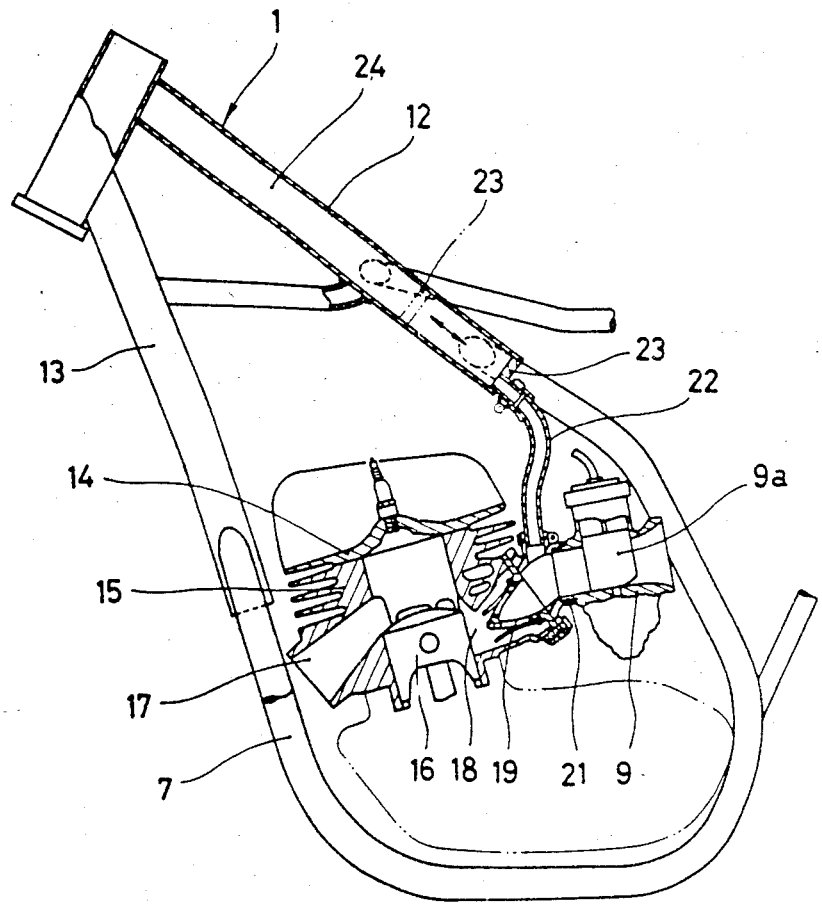
FIG. 2 is an enlarged side elevational view, with portion broken away and other portions shown in section, illustrating the induction system of the embodiment shown in FIG. 1.

FIG. 2 is a detailed view showing the first embodiment. As shown, a cylinder head 14, a cylinder block 15 and a piston 16 defined together the combustion chamber 10, which has one side wall formed with an exhaust passage 17 and its other side wall formed with an intake passage 18 equipped with a reed valve 19.

A spacer 21 is sandwiched between the reed valve 19 and the carburetor 9 equipped with a throttle valve 9a, and a connecting pipe 22 has its one end connected to the port 21a formed in the upper portion of that spacer 21 and its other end connected to a sealing member 23.

Figure 3:
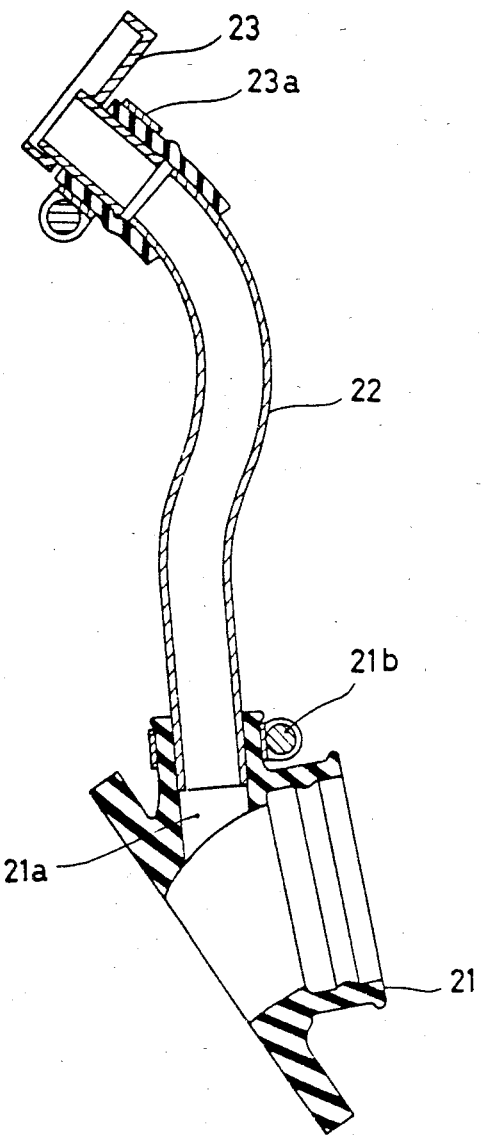
FIG. 3 is a still further enlarged cross-sectional view of the embodiment of FIGS. 1 and 2 showing further detail of the construction of the induction system.

FIG. 3 is a sectional view showing in detail the spacer 21, the connecting pipe 22 and the sealing member 23. The spacer 21 is molded of an elastic material such as synthetic rubber, and the connecting pipe is inserted in the port 21a formed in the upper portion of the spacer 21 and is fixed thereto by means of a fastening member 21b. The connecting pipe 22 is made of a material which has such a rigidity as can be bent but as is free from any change in the effective sectional area under the vacuum in the intake passage, e.g., a bellows-shaped flexible metal tube or a pressure-resisting hose of oil-free property.

The sealing member 23 is slidably and hermetically fitted in the lower portion of the main pipe 12 constructing the frame 1 and is made of an elastic material such as metal or synthetic rubber. In the case of the sealing member 23 made of metal, it is recommended to provide a sealing element such as an O-ring in order to improve the fitting property with the inner wall of the main pipe 12. The sealing member 23 thus made is fixed to the upper end of the connecting pipe 22 by means of a fastening member 23a.

The connecting pipe 22 shown in FIG. 3 has its one end inserted into the inside of the main pipe 12 such that it is moved up and down between the positions indicated in solid and dotted lines of FIG. 2 thereby to adjust the sealed space of the main pipe 12, i.e., the volume of an intake box or plenum chamber 24.

Figure 4:
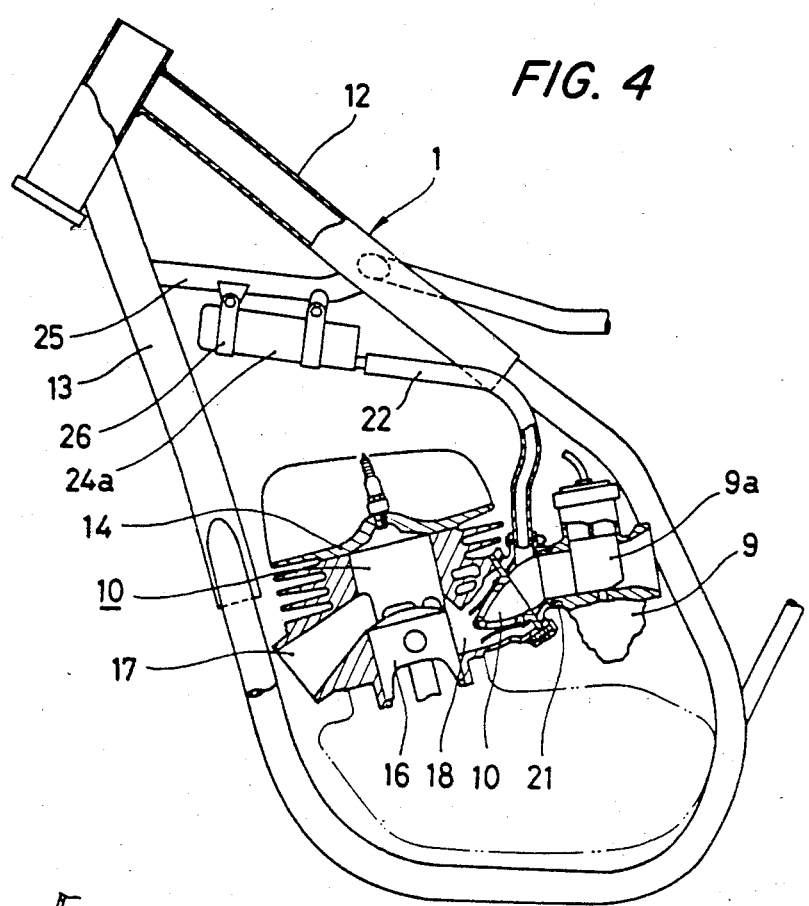
FIG. 4 is a side elevational view, with portions shown in section and other portions broken away, in part similar to FIG. 2, and showing another embodiment of the invention.
Figure 5:
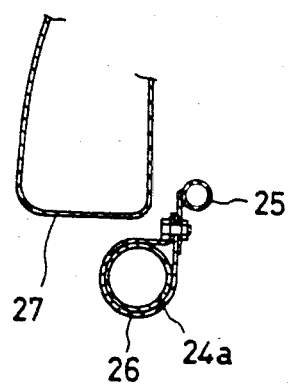
FIG. 5 is a cross-sectional view of the embodiment shown in FIG. 4 showing the mounting arrangement for the plenum chamber.

Turning now to FIGS. 4 and 5 showing a second embodiment of the present invention, an intake box or plenum chamber 24a is attached by means of a bracket 26 to a stay connecting the main pipe 12 and the down tube 13, and the connecting pipe 22 is connected to one end of that intake box or plenum chamber 24a. Below a fuel tank 27, as shown in FIG. 5, the intake box 24a is fixed to the stay 25 by means of the bracket 26 such that no substantial change is made in the appearance.

It is recommended that the mounting position of the connecting pipe 22 connecting the intake box or plenum chamber 24 or 24a and the intake passage is located between the reed valve and the throttle valve of the carburetor in the case of the system having the reed valve and between the cylinder inner wall portion of the cylinder intake port and the throttle valve of the carburetor.

In the first embodiment shown in FIG. 2, although the mounting of the connecting pipe 22 is performed through the spacer 21, the connecting pipe 22 may be mounted either on a boss attached to the carburetor or on a boss attached to the cylinder in the case of the piston valve.

In the first embodiment shown in FIGS. 1 to 3, since the main pipe 12 has its lower portion sealed by means of the slidable sealing member 23 thereby to form the intake box or plenum chamber 24, the main pipe 12 itself form the intake box or plenum chamber 24. As a result, the output characteristics of the internal combustion engine during the slow running operation can be improved without provision of any special intake box or plenum chamber while reducing the production cost and making the intake system compact.

The capacity of the intake box or plenum chamber is adjusted in accordance with the respective internal combustion engines because it has relationship with the capacity or the like of the intake passage leading from the carburetor to the intake valve or the like. Nevertheless, if the construction is made similar to that of the aforementioned first embodiment, the capacity of the intake box or plenum chamber can be adjusted to the most proper value in accordance with the respective internal combustion engines.

Many experiments conducted by use have revealed that the effective sectional area of the portion of the connecting pipe, which is opened into the intake passage 18, is proper if it is equal to or smaller than one fourth of that of the intake passage 18.

It is also proper if the capacity of the connecting pipe 22 is preset one tenth as large as that of the intake passage downstream of the throttle valve.

The intake box or plenum chamber functions to store the mixture, which temporarily resides in the vicinity of the intake valve when the intake valve is closed, during the slow running operation of the internal combustion engine, as has been described in the above, and to allow the mixture, which has been stored in that intake box or plenum chamber, to be sucked into the combustion chamber at the subsequent intake stroke, i.e., to flatten the flow of the mixture.

According to the present invention, since the intake box or plenum chamber having the aforementioned functions is provided in the member constructing the frame, preferably, in the main pipe (as in the first embodiment), any special device need not be added to facilitate the production of the system, and no change need not be made in the construction of the conventional internal combustion engine thereby to invite any substantial rise in the production cost. Moreover, if the sealing member for sealing one end of the main pipe is slidably provided, the most proper capacity of the intake box or plenum chamber can be attained in accordance with the running conditions of the respective internal combustion engines.

If, on the other hand, the intake box is provided above the frame, as shown in FIGS. 4 and 5, the space of the frame can be effectively used to hardly deteriorate the appearance of the motorcycle.

Incidentally, if the intake box or plenum chamber is made of a tubular member which is disposed above the intake passage and which is inclined downward, e.g., the main pipe or the down tube, there is no fear that the fuel resides therein and temporarily flows into the intake passage thereby to invite the disorder of the internal combustion engine. In view of these facts, it is recommended that the intake box or plenum chamber, which is separate from the member of the frame, as shown in FIG. 4, is inclined toward the intake passage even in case it is mounted.

It is understood that the foregoing description is that of preferred embodiments of the invention and that various changes and modifications may be made without departing from the spirit and scope of the invention as defined by the appended claims.

We claim:

1. In an induction system for a motor vehicle having a chassis and an engine supported thereby, said engine having a chamber of variable volume, an intake passage for supplying a charge to the chamber, and a throttle valve for controlling the flow through said intake passage, the improvement comprising a closed volume plenum chamber, conduit means interconnecting said plenum chamber directly and only with said intake passage downstream of said throttle valve, the volume of said plenum chamber and the effective cross-sectional area and length of said conduit means being proportional to induce a continuing flow of the charge through said intake passage and into said plenum chamber when said variable volume chamber is not inducting a charge through said intake passage for subsequent discharge of the charge from the plenum chamber along with a succeeding charge flowing from said intake passage upstream of said plenum chamber into the variable volume chamber when said variable volume chamber again inducts a charge, and means supporting said plenum chamber from said chassis independent of said engine and of said conduit means.

2. An induction system for a motor vehicle having a chassis including a frame tube, an engine supported by said chassis, said engine having a chamber of variable volume, an intake passage for supplying a charge to the chamber, and a throttle valve for controlling the flow through said intake passage, the improvement comprising a closed volume plenum chamber comprising a sealed portion of said frame tube, said plenum chamber having a single opening and conduit means interconnecting said plenum chamber single opening directly and only with said intake passage downstream of said throttle valve.

3. An induction system as set forth in claims 1 or 2 wherein the conduit means include a flexible section having sufficient rigidity to permit flexure thereof without significantly changing the cross-sectional area thereof.

4. An induction system as set forth in claim 2 wherein the sealed portion of the frame tube is disposed in proximity to the induction passage between the throttle valve and the chamber.

5. An induction system as set forth in claim 4 wherein the chassis includes a tubular frame and the frame tube constitutes one element of said tubular frame.

* * * * *